(12) United States Patent
Ritchey

(10) Patent No.: US 6,886,844 B2
(45) Date of Patent: May 3, 2005

(54) SYSTEM AND METHOD FOR CONNECTING PARTS

(75) Inventor: Thomas Ritchey, Woodside, CA (US)

(73) Assignee: Ritchey Designs, Inc., Reno, NV (US)

(*) Notice: Subject to any disclaimer, the term of this patent is extended or adjusted under 35 U.S.C. 154(b) by 41 days.

(21) Appl. No.: 10/256,637

(22) Filed: Sep. 27, 2002

(65) Prior Publication Data

US 2003/0080531 A1 May 1, 2003

Related U.S. Application Data

(60) Provisional application No. 60/326,173, filed on Sep. 28, 2001.

(51) Int. Cl.$^7$ ................................................ B62K 19/18
(52) U.S. Cl. ........................ 280/278; 280/287; 285/330; 403/DIG. 7
(58) Field of Search ................................ 280/287, 278, 280/281.1, 288.4; 403/DIG. 7, 179, 183, 292, 293, 309, 360, 373, 406.1, 407.1, 338, 341, 242, 243, 245, 252, 330

(56) References Cited

U.S. PATENT DOCUMENTS

| | | | |
|---|---|---|---|
| 1,428,496 A | * | 9/1922 | Roquefort-Villeneuve .. 280/278 |
| 2,211,164 A | | 8/1940 | Rippenbein ................. 280/287 |
| 2,447,956 A | * | 8/1948 | Morders ..................... 403/305 |
| 2,950,930 A | * | 8/1960 | Dunmire ..................... 285/110 |
| 3,074,741 A | * | 1/1963 | Rutkove ..................... 280/278 |
| 3,289,491 A | * | 12/1966 | Conrad ..................... 74/502.4 |
| 3,458,217 A | * | 7/1969 | Pride .............................. 285/3 |
| 4,065,846 A | * | 1/1978 | Leonard, Jr. ............. 29/525.08 |
| 4,606,111 A | * | 8/1986 | Okazaki et al. ............... 29/463 |
| 4,776,721 A | * | 10/1988 | Lange ........................ 403/171 |
| 5,346,237 A | * | 9/1994 | Wang ...................... 280/281.1 |
| 5,360,225 A | * | 11/1994 | Chen ........................... 280/278 |
| 5,419,574 A | * | 5/1995 | Krumm ....................... 280/278 |
| 5,498,014 A | | 3/1996 | Kulhawik et al. |
| 5,558,349 A | | 9/1996 | Rubin |
| 5,586,652 A | | 12/1996 | Smilanick |
| 5,813,683 A | | 9/1998 | Kulhawik |
| 5,975,551 A | * | 11/1999 | Montague et al. .......... 280/287 |
| 6,053,504 A | * | 4/2000 | Winterhoff et al. ......... 277/603 |
| 6,056,332 A | * | 5/2000 | Foster ........................ 285/367 |
| 6,267,401 B1 | | 7/2001 | De Jong |
| 6,267,417 B1 | * | 7/2001 | Fan ............................ 285/330 |
| 6,349,614 B1 | * | 2/2002 | Matsuo ...................... 74/502.6 |

FOREIGN PATENT DOCUMENTS

| | | |
|---|---|---|
| DE | 10241 | 7/1880 |
| DE | 76008 | 8/1893 |
| DE | 835536 | 4/1952 |
| DE | 866881 | 2/1953 |
| DE | 870347 | 3/1953 |
| DE | 1505242 | 7/1969 |
| DE | 2145831 | 3/1973 |
| DE | 19636516 | 3/1997 |
| FR | 992681 | 10/1951 |

* cited by examiner

*Primary Examiner*—Anne Marie Boehler
(74) *Attorney, Agent, or Firm*—DLA Piper Rudnick Gray Cary US LLP

(57) ABSTRACT

A system and method for connecting dissimilar materials is described. In one embodiment, the system may be used to produce a break apart frame that includes a first section and a second part which is disengagably connected to the first part by fastening members. The first part includes a head tube, a top tube and a down tube. The second section includes a bottom bracket, a seat tube, a pair of seat stays and a pair of chain stays. A connection tube extends from the bottom bracket so as to be disengagably connected to the down tube. An end tube is connected to the seat tube and disengagably connected to the seat tube.

27 Claims, 18 Drawing Sheets

_US 6,886,844 B2_

SYSTEM AND METHOD FOR CONNECTING PARTS

RELATED APPLICATION

This application claims priority from U.S. Provisional Application No. 60/326,173 filed on Sep. 28, 2001, which is incorporated herein in its entirety.

BACKGROUND OF THE INVENTION

This invention relates generally to a system and method for connecting materials that are typically difficult to connect together, and particularly to assembling sections of a bicycle frame that can be disassembled for convenient transport and storage.

In typical applications where it is desirable to connect two different materials together, it is often not attempted due to the problems ensuring a good connection. In one example, a bicycle frame may have one or more different pieces that are made of different materials, such as metal parts that need to be connected to carbon fiber parts. Typically, it is necessary to bond the carbon fiber parts to the metal part although the bonding process is not very strong and tends to break. The bonding process is also susceptible to corrosion and requires the builder to have specialized skills and equipment. Thus, the typical bonding process has undesirable drawbacks including a weak connection between the two different parts that is susceptible to breakage. Thus, it is desirable to provide a system for connecting parts of two different materials, such as different parts of a bicycle frame, and it is to this end that the present invention is directed.

FIG. 14 shows a conventional bicycle 1 which generally includes a front wheel 2, pedals 4, a rear derailleur 6 for moving a chain 5 over a sprocket cassette 7 attached to a rear wheel 3, and hand brakes 9 attached to handlebars 10. These components are in fixed positions relative to one another and to a triangular bicycle frame that includes a top tube 12, a down tube 13, and a seat tube 16. The seat tube 16, the down tube 13, and the pedal assembly 4 meet at a bottom bracket shell that is not shown in the figure. The "pedal assembly," as used herein, includes a crank, pedals, and various peripheral components that make the pedals function properly. Also extending from the bottom bracket is a pair of chain stays 15a. The chain stays 15a, of which only one is shown, connect the pedal assembly to the hub of the rear wheel 3 on both sides of the rear wheel 3. A pair of seat stays 150 connect the hub of the rear wheel 3 to the top of the seat tube 16 on both sides of the rear wheel 3. The chain stays 15 and the seat stays 150 connect at the hub of the rear wheel 3 so as to form a V-shape on either side of the bicycle 1. The angled portion of the V-shaped chain stay 15 is attached to an area near the hub of the rear wheel 3 and the two ends connect to the hidden bottom bracket and the seat tube 16, respectively. The seat tube 16 supports the bicycle seat 18 by holding up the seat post 17.

A rider uses the handlebars 9 to steer the bicycle in the desired direction. Located near the handlebars 9 are hand brakes 8 and gear shifter 10. The hand brakes 8 are coupled to the brakes by a rear wheel brake cable 112a and a front wheel brake cable 112b. Similarly, the gear shifter 10 shifts gears by activating the rear derailleur 6 and a derailleur 19 to which it is connected by two respective derailleur cables. Only part of the derailleur cables are shown as derailleur cable 113 in order to avoid cluttering the figure.

The triangular bicycle frame is typically a one-piece member so that it occupies a large space and is inconvenient to be carried and stored. The one-piece frame also increases the space required to store the frame and incurs airline cargo charges. A bicycle frame that is easy to store and transport while being at least as sturdy and reliable as the one-piece bicycle is necessary.

SUMMARY OF THE INVENTION

The invention provides a system and method for connecting two dissimilar materials together in a unique manner. In some embodiments, the system may be used to connect portions of a multi-piece bicycle frame as described below. The invention can also be used to connect various other pieces of dissimilar materials together.

In accordance with one aspect of the present invention, there is provided a break apart frame which comprises a first section and a second section which is disengagably connected to the first section by fastening devices or connecting members. The first section includes a head tube with a top tube and a down tube extending therefrom and an end tube that is connected to a distal end of the top tube. The second section includes a bottom bracket with a seat tube extending therefrom that is disengagably connected of the end tube. A connection tube extends from the bottom bracket so as to be disengagably connected to the down tube. A pair of chain stays are connected to the bottom bracket. In some frames, the two different portions are made of different materials, such as a metal alloy first portion and a carbon kevlar fiber second portion. The present invention provides a break apart bicycle frame that can be disassembled into two sections for convenient storage and transportation.

DETAILED DESCRIPTION OF A PREFERRED EMBODIMENT

The invention is particularly applicable to a multiple-piece bicycle frame that is assembled according to the invention and it is in this context that the invention will be described. It will be appreciated, however, that the connection system and method in accordance with the invention has greater utility, such as to being used for connecting any two dissimilar materials together.

As used herein, "horizontal" and "horizontally" refer to a direction in a plane parallel to the ground and "vertical" and "vertically" refer to a direction orthogonal to the plane of the ground. Also, "downward" and "down" refer to a direction in which the ground becomes closer, while "upward" and "up" refer to a direction in which the ground becomes farther away.

Figure 1:
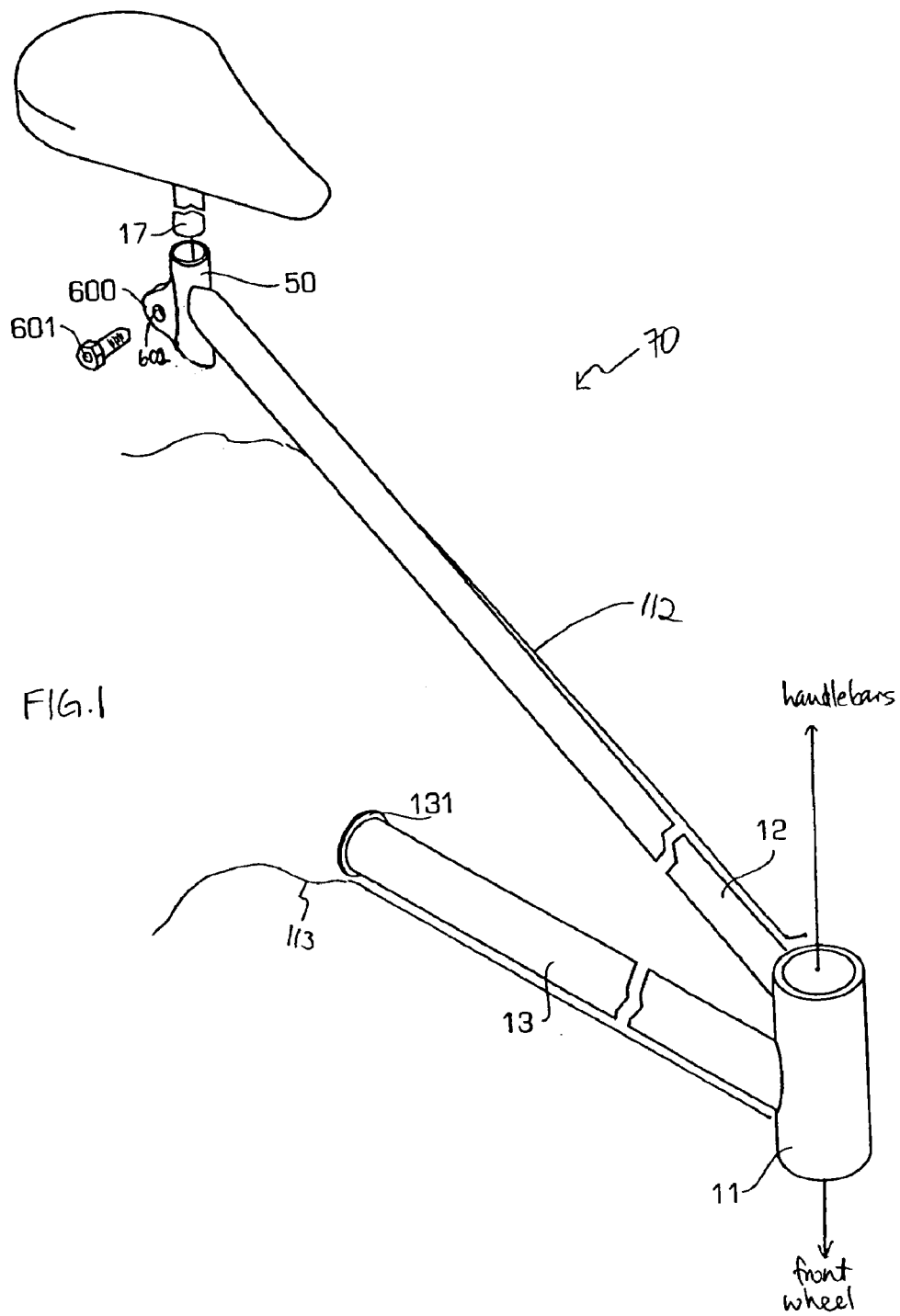
FIG. 1 depicts a first bicycle frame section of an exemplary multi-piece bicycle in accordance with the invention.

FIG. 1 depicts a first bicycle frame section 70 of an exemplary multi-piece (break apart) bicycle in accordance with the invention. The first bicycle frame section 70 is designed to be assembled with other sections to form a bicycle. The first bicycle frame section 70 comprises a head tube 11 to which a handlebar (not shown) and a front wheel (not shown) are to be coupled, and a top tube 12 and a down tube 13 extending from the head tube 11 at an angle to each other. Although not clear from the figure, top tube 12 typically extends in a substantially horizontal direction. At the distal end of the top tube 12 is an end tube 50 to which a seat post 17 is to be connected. The end tube 50 is a hollow tube having a sidewall with a pair of lugs 600. Each of the lugs 600 has a hole 602, which may be threaded, and the holes are aligned so that a screw bolt 601 may be inserted through the holes. When the screw bolt 601 is threaded into the holes 602, the end tube 50 tightens around the object that is inserted into the hollow end tube 50, such as the seat tube 17. At the distal end of the down tube 13 is a first annular lip 131. An annular lip, as used herein, refers to any protruding portion at or near an end of a frame portion, such as a flange.

Figure 14:
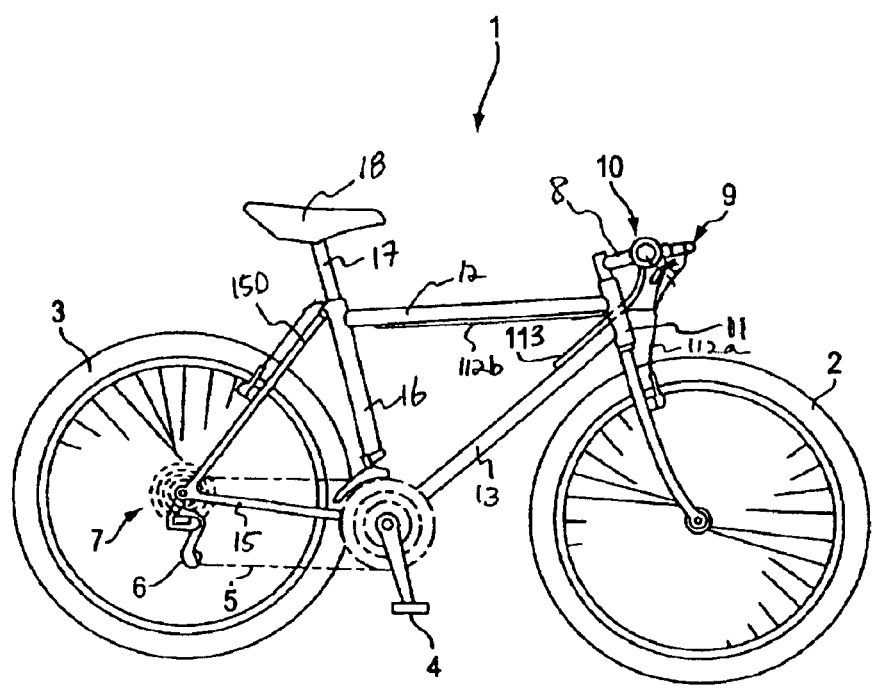
FIG. 14 depicts a one-piece bicycle.

Extending alongside the top tube 12 is a brake cable 112 that constitutes a part of the bicycle's braking mechanism. The brake cable 112 extends from the hand brakes that are attached near the handlebars 8 (not shown) to a pair of brake pads that act on the rear wheel 3 (see FIG. 14). The brake cable 112 typically extends substantially parallel to the top tube 12. Extending along the down tube 13 is a derailleur cable 113 that connects the gear shifter 10 (see FIG. 14) located near the handlebars to the derailleur located near the rear wheel.

Figure 2:
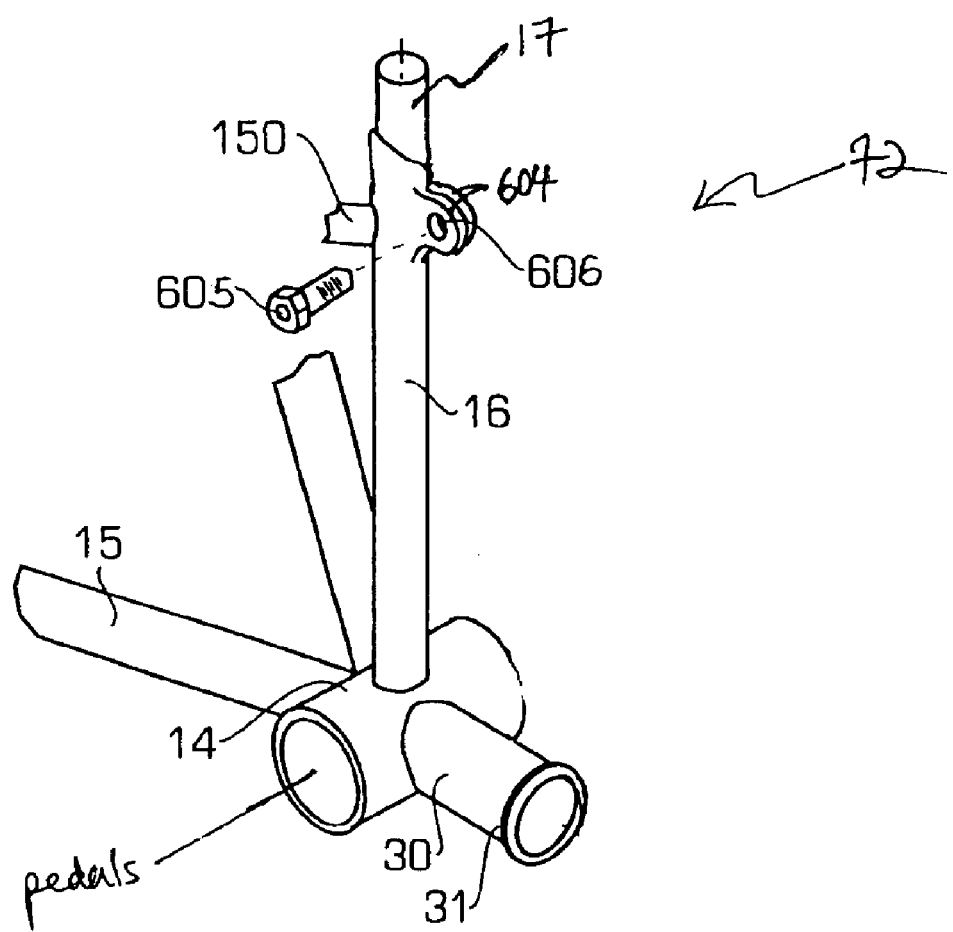
FIG. 2 depicts a second bicycle frame section that is assembled with the first bicycle frame section of FIG. 1.

FIG. 2 depicts a second bicycle frame section 72 including a bottom bracket shell 14 to which the pedal assembly 4 (see FIG. 14) is attached. Besides the pedal assembly, a pair of chain stays 15a, a seat tube 16, and a connection tube 30 extend from the bottom bracket shell 14 in different directions. The chain stays 15 connect the bottom bracket shell 14 to the hub of the rear wheel 3, while the seat tube 16 extends substantially vertically to be joined with the end tube 50 of the first bicycle frame section 70. A pair of seat stays 150 are connected to the seat tube 16. Like the end tube 50 (see FIG. 1), the seat tube 16 has two lugs 604 connected to the sidewall of the hollow tube 16 so that the seat tube 16 can be tightened around an object (e.g., seat post 17) by screwing a bolt 605 into holes 606. The two lugs 604 are separated from each other, for example with a slit (not shown) located between the two lugs and extending part way down the seat tube 16. When the screw bolt 605 is screwed into holes 606, the two lugs 600 are brought closer to each other, narrowing the slit. The connection tube 30 extends from the bottom bracket shell 14 toward the down tube 13 of the first bicycle frame section 70. The connection tube 30 has a second annular lip 31 at the distal end. The second annular lip 31 may have the same diameter as the first annular lip 131 of the first bicycle frame section 70 so that the two annular lips can be matched up upon assembling. Since the derailleur cable 113 extends along the down tube 13 from the hand brakes attached near the handle bars (not shown) to a rear wheel (not shown), the derailleur cable 113 needs to be connected across the down tube when the first and second bicycle frame sections 70 and 72 are assembled. Details on how the cable 113 is assembled are provided below, in reference to FIGS. 8A–8E.

Figure 3:
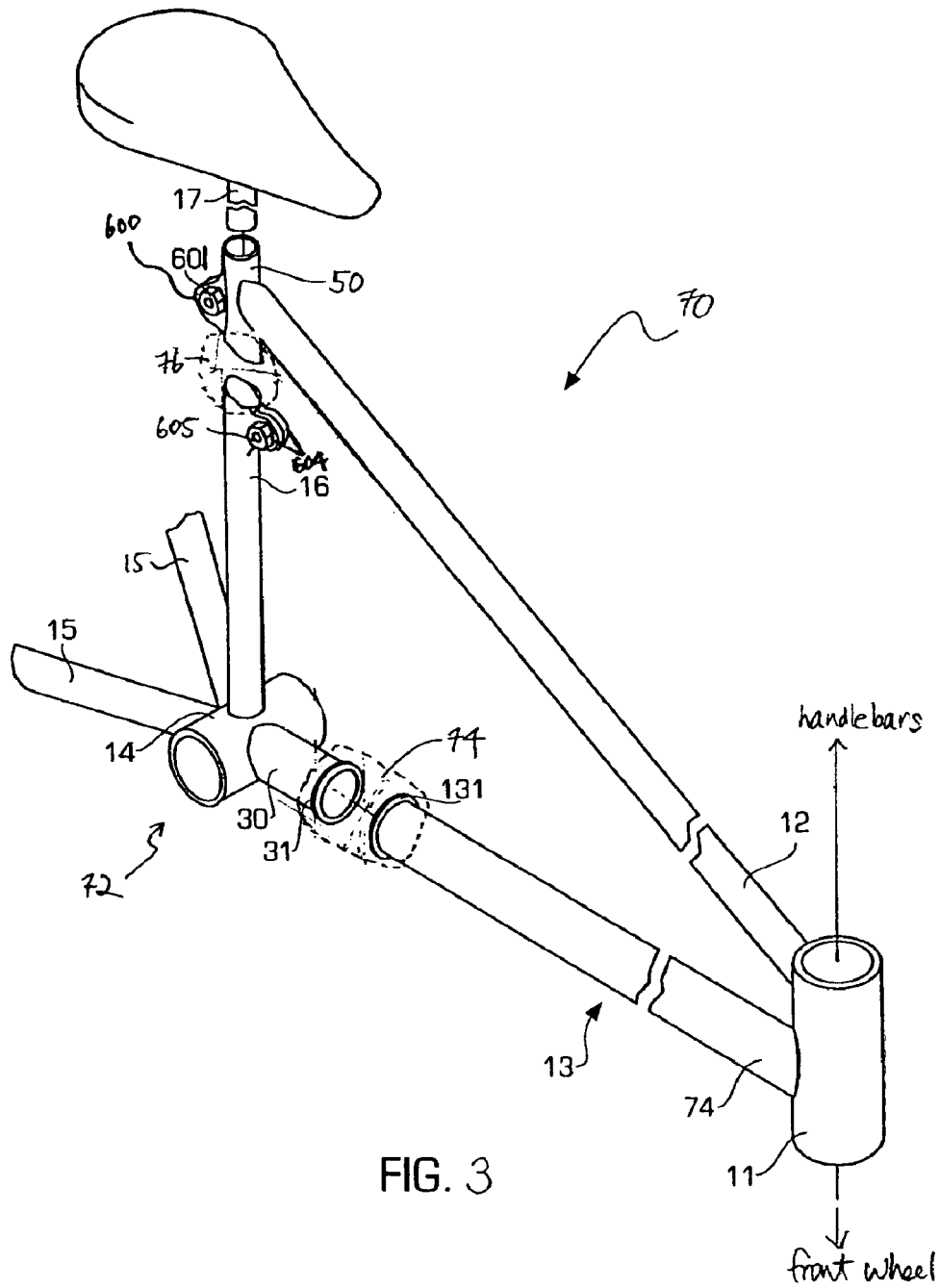
FIG. 3 depicts a manner in which the first bicycle frame section of FIG. 1 and the second bicycle frame section of FIG. 2 are assembled.

FIG. 3 depicts how the first bicycle frame section 70 and the second bicycle frame section 72 are assembled by connecting the two sections at a down tube junction 74 and a seat tube junction 76. At the down tube junction 74, the first annular lip 131 is connected with the second annular lip 31 with a clamp 20 shown in FIG. 4A and FIG. 5A below, in the manner shown in FIGS. 4B and 5B. At the seat tube junction 76, the end tube 50 is connected with the seat tube 16. Preferably, the end tube 50 and the seat tube 16 have approximately the same diameter. Since both the end tube 50 and the seat tube 16 are hollow, the seat post 17 is inserted through the end tube 50 and into the seat tube 16. Once the seat post 17 is inserted to achieve the seat height desired by the rider, the end tube 50 and the seat tube 16 are tightened around the seat post 17 by screwing a bolt into the openings of lugs 600 and lugs 604. More details about how the end tube 50 and the seat tube 16 are connected are provided below, in reference to FIGS. 9A and 8B. The rear wheel brake cable 112 and the derailleur cable 113 are omitted in FIG. 3 for clarity of illustration on how the first bicycle frame section 70 is assembled with the second bicycle frame section 72. The first bicycle frame section 70 and the second bicycle frame section 72 may be made of aluminum, aluminum alloy, titanium, carbon fiber, and sometimes magnesium. The first bicycle frame section 70 and the second bicycle frame section 72 need not be made of the same material.

Figure 4A:
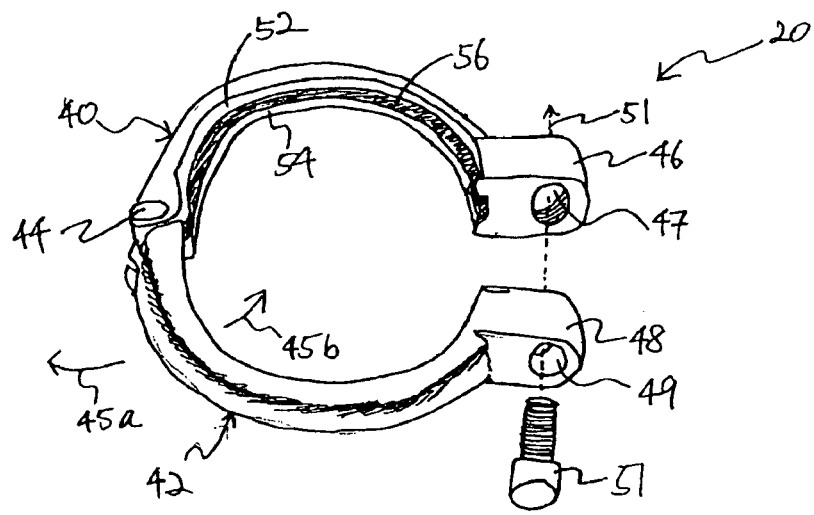
FIG. 4A depicts an exemplary clamp that may be used to connect two parts in accordance with the invention.

FIG. 4A depicts an exemplary clamp 20 that may be used for the down tube junction 74 in accordance with the invention. The clamp 20 joins the first annular lip 131 with the second annular lip 31 (see FIG. 4B), thereby securely connecting the down tube 13 with the connection tube 30 so that they do not disengage during a ride. The clamp 20 may include an upper arm 40 and a lower arm 42 hinged together by a hinge 44 that permits the two arms to pivot with respect to each other. For example, the hinge 44 allows the lower arm 42 to pivot around the hinge 44 in the directions indicated by arrows 45a and 45b. The upper arm 40 may have a semicircular shape with the hinge 44 on one end and a first connecting shoulder 46 on the other. The first connecting shoulder 46 has a hole 47 that extends all the way across the connector shoulder 46, and the inside of hole 47 is threaded so that a screw bolt 51a may be inserted into it. The lower arm 42 may have a semicircular shape similar to the upper arm 40 with one end connected to the hinge 44 and another end having a second connecting shoulder 48. Like the first connecting shoulder 46, the second connecting shoulder 48 has a hole 49 extending through it so that a screw bolt 51*a* can be inserted first through the hole 49 and then through the hole 47 as shown by the arrow 51, connecting the first and the second connecting shoulders. When the lower arm 42 is pivoted around the hinge 44 in the direction of arrow 45*a* so that the two connecting shoulders 46 and 48 are far apart from each other, the clamp is said to be "opened." On the other hand, when the lower arm 42 is pivoted in the direction of arrow 45*b* so that the two connecting shoulders 46 and 48 are close or touching, the clamp is said to be "closed." As the screw bolt 51*a* is threaded through the holes 49 and 47, clamp 20 tightens, bringing the connecting shoulders 46 and 48 closer to each other.

Each arm of the clamp 20 may have a groove 56 into which the first annular lip 131 and the second annular lip 31 may be placed so that the clamp 20 holds the two annular lips securely together. The groove 56 is a recessed portion located on the inside surface of the clamp 20 between a first sidewall 52 and a second sidewall 54. The width of the groove 56 is approximately equal to the combined width of the annular lips 131 and 31. The groove 56 may be angled/tapered so that it fits around the annular lips tighter as the annular lips go further into the groove 56. The angled/tapered shape of the groove 56 ensures that as the screw bolt 50 is threaded into the holes 49 and 47, the annular lips 31 and 131 are forced into the narrower portion of the groove 56, being pressed together tighter. A person of ordinary skill in the art would understand to select a curvature and depth for the groove 56 that best holds the annular lips together.

Figure 4B:
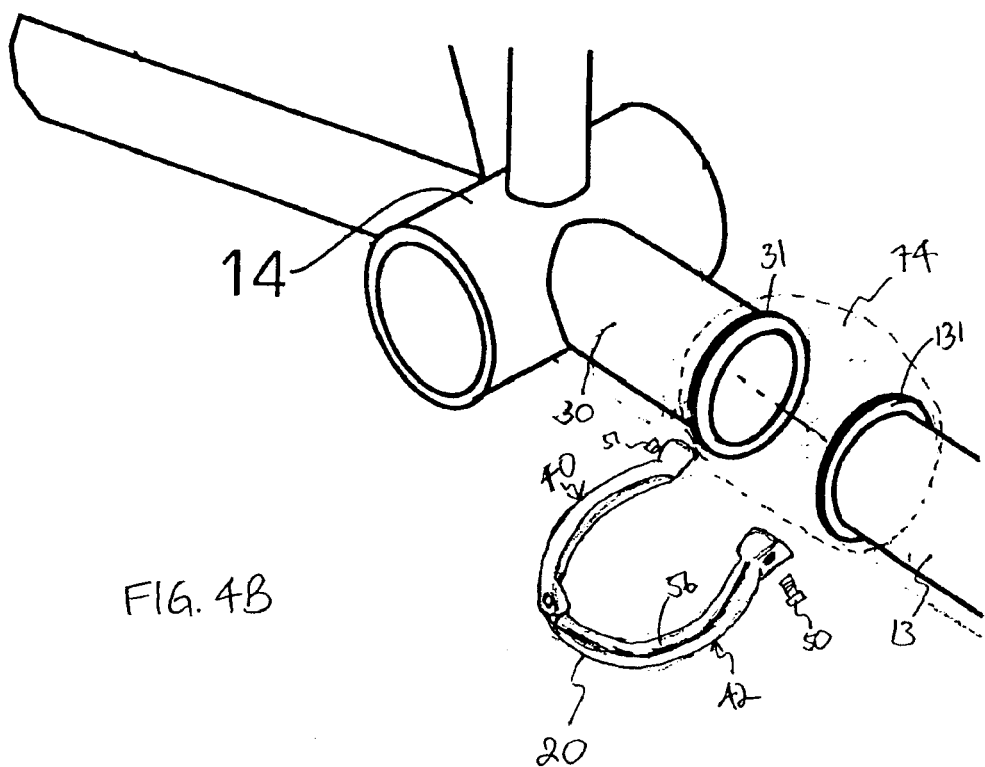
FIG. 4B depicts how the clamp of FIG. 4A may be used to connect two parts.

FIG. 4B depicts how the clamp 20 may be used to connect the first annular lip 131 and the second annular lip 31. The annular lips 131 and 31, which are approximately the same size, are placed in contact with each other to form a juncture ring having the combined thickness of the first annular lip 131 and the second annular lip 31. The clamp is then "opened" so that it can be placed around the first annular lip 131 and the second annular lip 31. After the groove 56 is positioned over the juncture ring, the clamp is "closed" so that the junction is inserted into the groove 56. Then, the screw bolt 51*a* is used to tighten the clamp 20. In addition, a nut 53 may be threaded onto the bolt and tightened to connect the two annular lips together, thereby joining the connecting tube 30 with the down tube 13. Any conventional securing means other than a screw bolt and a nut may be used.

Figure 5A:
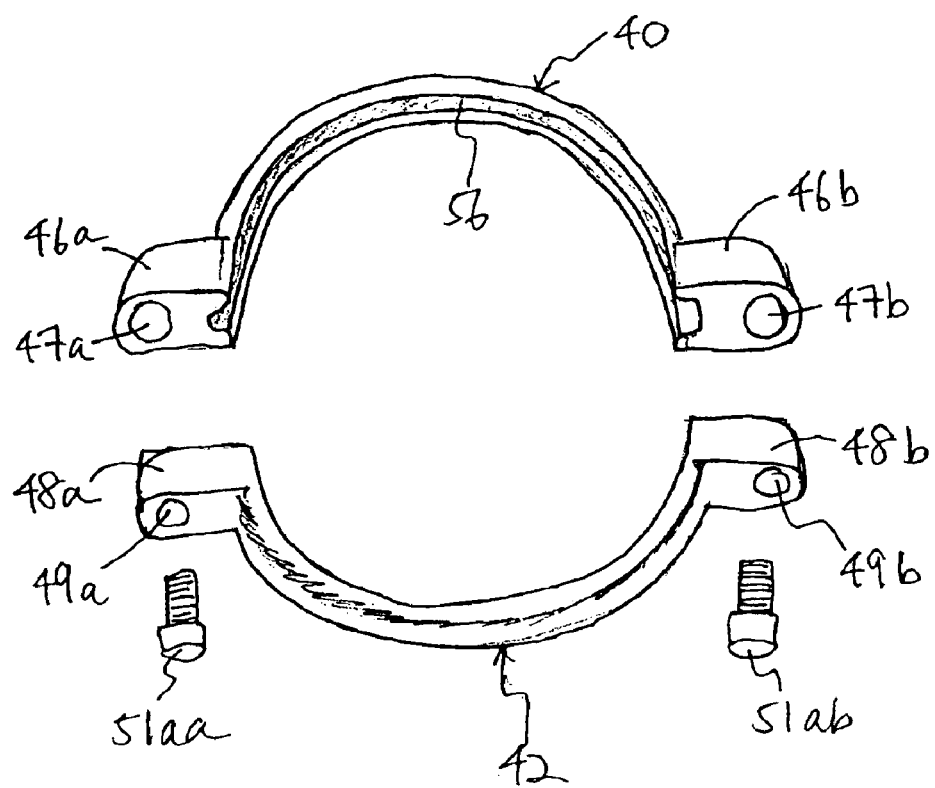
FIG. 5A depicts an alternative clamp that may be used to connect two parts in accordance with the invention.

FIG. 5A depicts an alternative clamp 20 that may be used to join the first annular lip 131 with the second annular lip 31. This alternative clamp 20 is similar to the clamp shown in FIG. 4A in that it includes an upper arm 40 and a lower arm 42 having semicircular shapes. However, unlike the clamp in FIG. 4A, the two arms of the alternative clamp 20 are not connected by a hinge. Instead of a hinge, each arm has two lugs, one on each end. The upper arm 40 has a connector shoulder 46*a* and a connector shoulder 46*b*, each of which has a threaded hole 47*a* and 47*b*, respectively. Likewise, The lower arm 42 has a lug 48*a* and a lug 48*b* with holes 49*a* and 49*b*, respectively. A first screw bolt 51*aa* may be inserted through hole 49*a* and hole 47*a*, and a second screw bolt 51*ab* may be inserted through hole 49*b* and hole 47*b*. The upper arm 40 and the lower arm 42 have a groove 56 in which the first annular lip 131 and the second annular lip 31 are placed and held together. When the bolts are screwed in, the upper arm and the lower arm come close together, tightening around the down tube 13 and the connection tube 30 and fastening them together. The inside wall of this two-piece clamp 20 has a groove 56 similar to the inside wall of the one-piece clamp 20 shown in FIG. 4A.

Figure 5B:
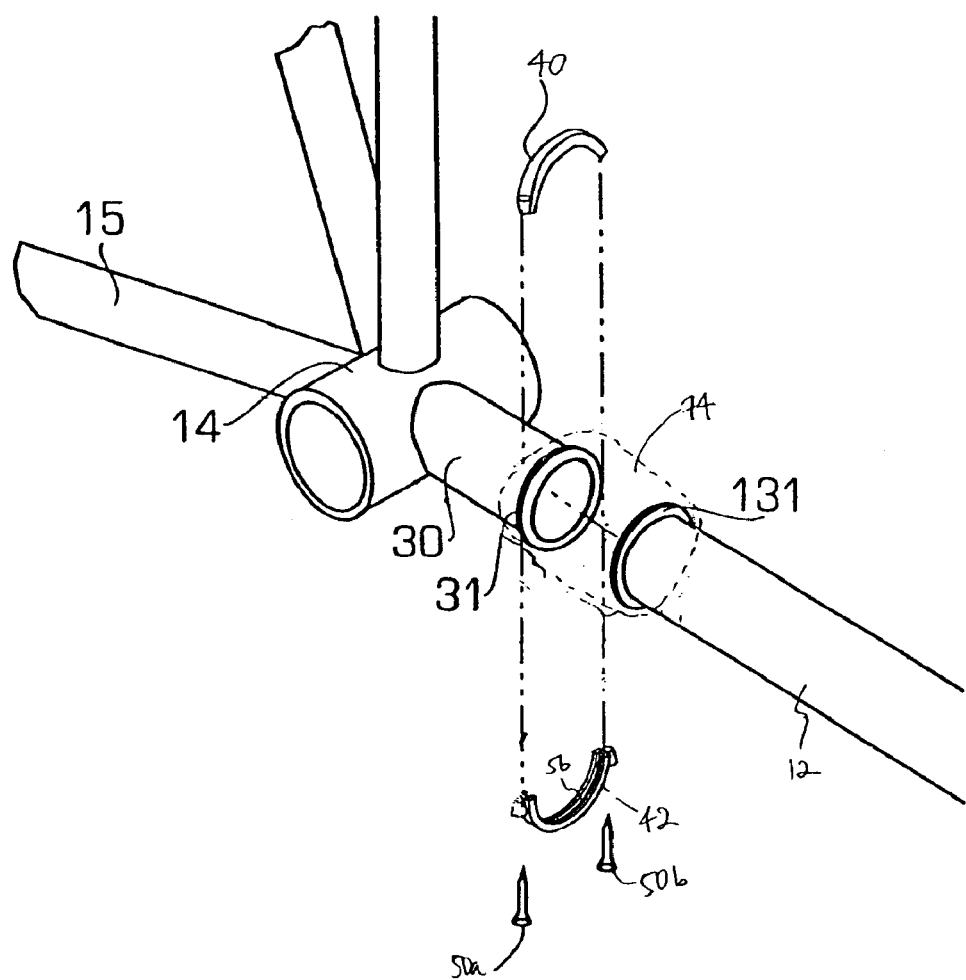
FIG. 5B depicts how the clamp of FIG. 5A may be used to connect two parts.

FIG. 5B depicts how alternative clamp 20 may be used to connect the first annular lip 131 and the second annular lip 31. The upper arm 40 is placed above the down tube junction 74, and the lower arm 42 is placed underneath the down tube junction 74 with the inside walls of each arm facing the junction. Then, the annular lips 131 and 31 are matched and pressed against each other to form a juncture ring that includes a circular interface of the two annular lips. The upper arm 40 is positioned to fit the upper part of the ring into the groove 56 (not shown), and the lower arm 42 is raised to fit the lower part of the ring into the groove 56. The screw bolts 50*a* and 50*b* are then used to hold the upper arm 40 and the lower arm 42 together, which in turn hold the annular lips together at the down tube junction 74.

Figure 6A:
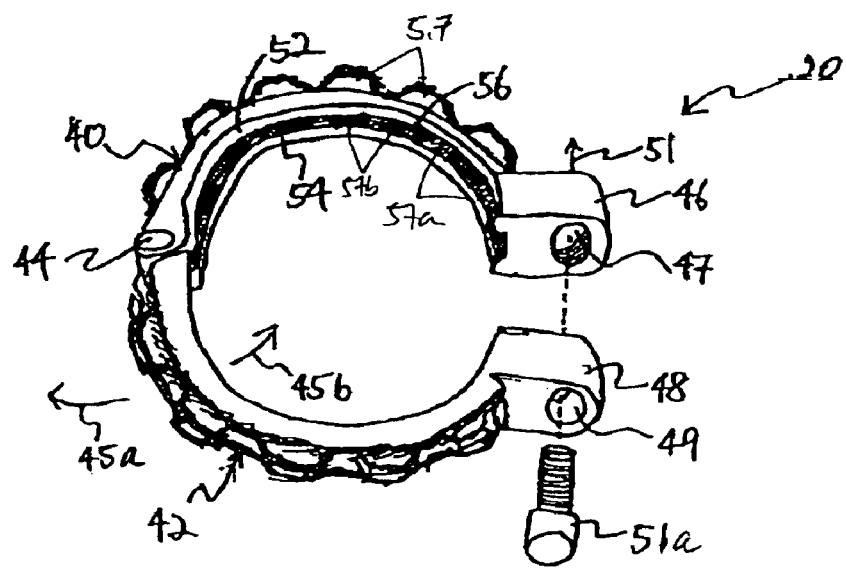
FIG. 6A depicts yet another alternative clamp that may be used to connect two parts in accordance with the invention.

FIG. 6A shows yet another alternative embodiment of clamp 20 that may be used to join the first annular lip 131 with the second annular lip 31. The clamp 20 shown in FIG. 6A is substantially similar to the clamp 20 shown in FIG. 4A except for teeth 57 in the groove 56. The groove 56, instead of being a continuous receded portion along the inner periphery of the clamp 20, includes substantially flat portions 57*a* and receded portions 57*b* that are arranged in an alternating manner. This type of clamp 20 with teeth 57 is useful for modified versions of annular lips 31 and 131 that also have teeth. The receded portions 57*b* of the groove 56 may be angled/tapered like the continuous groove 56 in FIG. 4A so that each of the teeth gets "sharper" as it gets closer to the end.

Figure 6B:
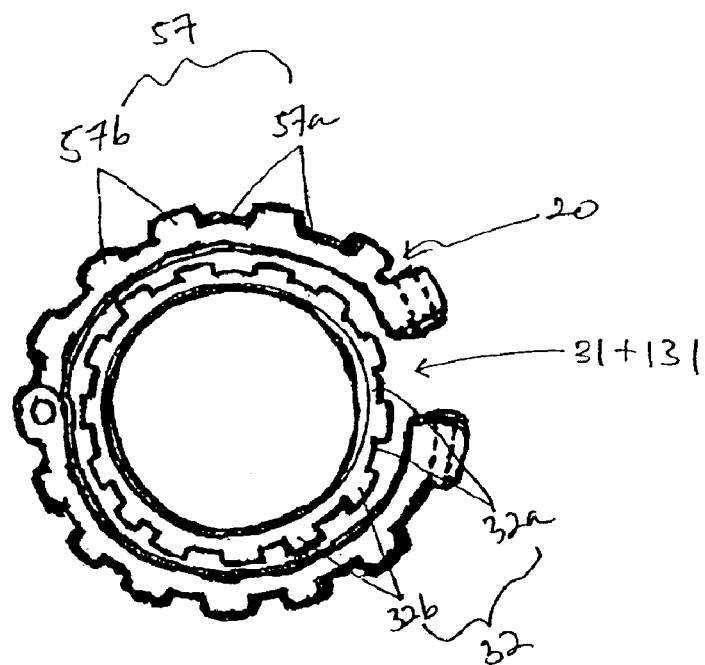
FIG. 6B depicts how the clamp of FIG. 6A fits around annular lips.

FIG. 6B depicts how the teeth 57 of clamp 20 fit around annular lips 31 and 131. In order for a clamp 20 that has teeth to be used, the annular lips 31 and 131 must also have teeth 32 including flat portions 32*a* and protruding portions 32*b*. Each of the protruding portions 32*b* is shaped and sized to fit into the receding portion 57*b* and the flat portions 32*a* are designed so that when the protruding portions 32*b* are inserted into the receding portions 57*b*, the flat portions 32*a* come in contact with the flat portions 57*a*. A person of ordinary skill in the art would understand how to design the teeth 57 on the clamp 20 to provide a secure interlocking seal between the annular lips 31 and 131 that have teeth 32.

Figure 6C:
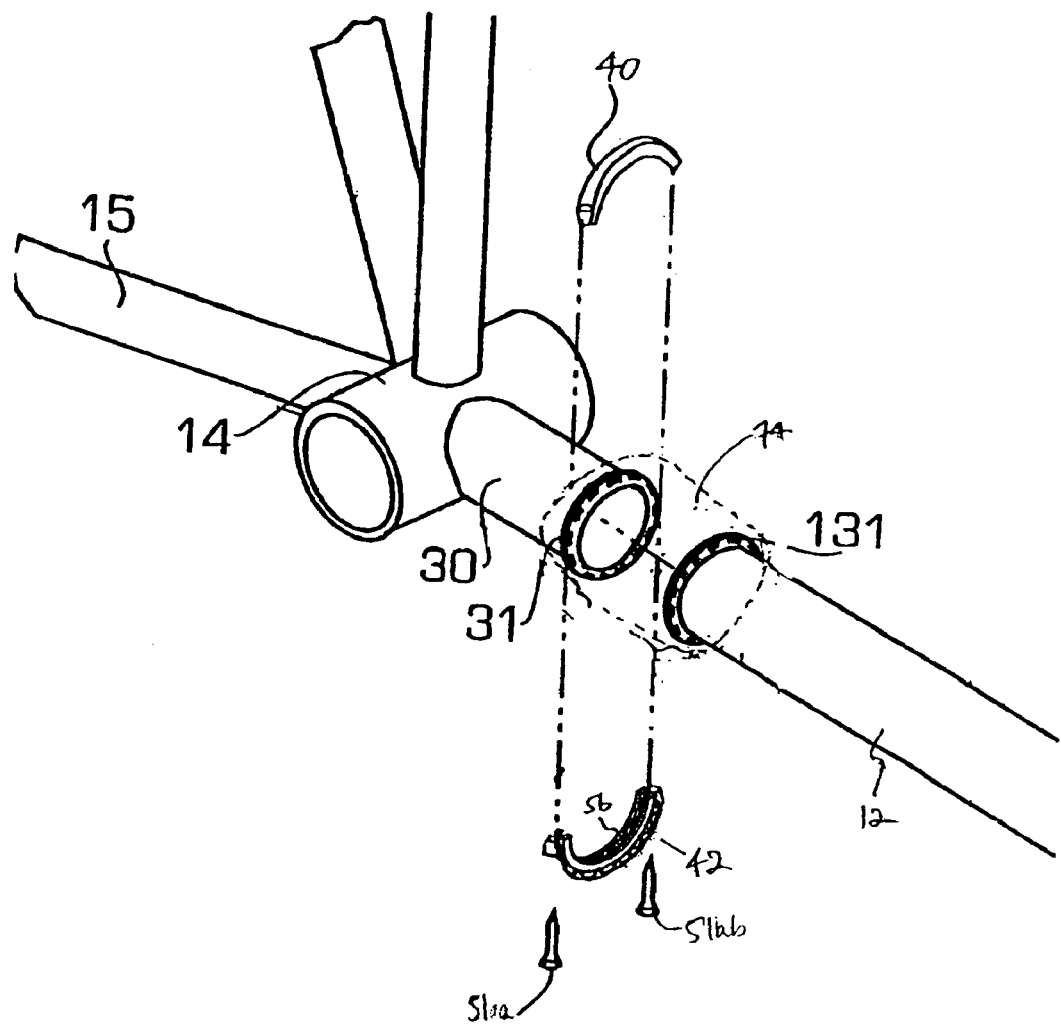
FIG. 6C depicts how the clamp of FIG. 6A may be used to connect two parts.

FIG. 6C depicts how the clamp 20 of FIG. 6A is used to connect the first annular lip 131 and the second annular lip 31. The upper arm 40 is placed above the down tube junction 74, and the lower arm 42 is placed underneath the down tube junction 74 with the inside walls of each arm facing the junction. Then, the flat portions 32*a* and the protruding portions 32*b* of the annular lips 131 and 31 are matched and pressed against each other to form a juncture ring that includes an interface of the two annular lips. The upper arm 40 is positioned to fit the protruding portions 32*b* of the upper half of the juncture ring into the receding portions 57*b* (not shown), and the lower arm 42 is raised to fit the protruding portions 32*b* of the lower half of the juncture ring into the receding portions 57*b*. The screw bolts 51*aa* and 51*ab* are then used to hold the upper arm 40 and the lower arm 42 together, which in turn hold the annular lips together at the down tube junction 74.

The clamp 20 may be made of investment cast steel, stainless steel, or any other material of sufficient strength. Optionally, the clamp may be coated to prevent rusting, for example with nickel. A person of ordinary skill in the art would understand that the material of which the clamp 20 is made should be determined based on the types of material the bicycle frames are made. Similarly, the dimensions of the clamp 20 are adapted to the dimensions of the bicycle frames.

Figure 7A:
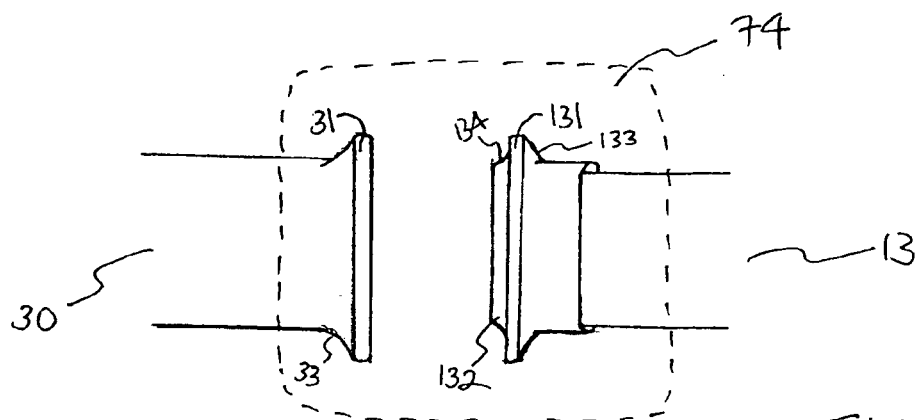
FIG. 7A depicts the parts that may be connected by the clamp of FIG. 4A or the clamp of FIG. 5A.

FIG. 7A depicts the connection tube 30 and the down tube 13 at the down tube junction 74. Both the connection tube 30 and the down tube 13 have annular lips 31 and 131, respectively, of substantially the same diameter. In some embodiments, one of the tubes to be connected (e.g., the down tube 13 in the figure) has an inner lip 132. The inner lip 132 has an outer diameter that is smaller than the inner diameter of the connecting tube 30 by just enough so that when the two annular lips are matched and pressed against each other, the inner lip 132 is inserted into the connection tube 30. The surface of the down tube 13 curves up to form a slope 133 that becomes the first annular lip 131. Similarly, the surface of the first annular lip 131 curves toward the inside of the tube to form a curve 134 which turns into the inner lip 132. The diameter of the inner lip 132 is smaller than the diameter of the down tube 13, and the diameter of the down tube 13 is smaller than the diameter of the first annular lip 131. As for the connection tube 30, the outer surface of the connection tube 30 curves outward to form a slope 33 which eventually becomes the second annular lip 31 having a larger diameter than the connection tube 30. The second annular lip 31 then curves down first toward the center of the tube and then toward the inner wall of the tube, forming an edge 34 (see FIG. 7B). The structures of the connection tube 30 and the down tube 13 at the down tube junction 74 are interchangeable, as long as one of the tubes has the inner lip 132 and the other tube does not.

Figure 7B:
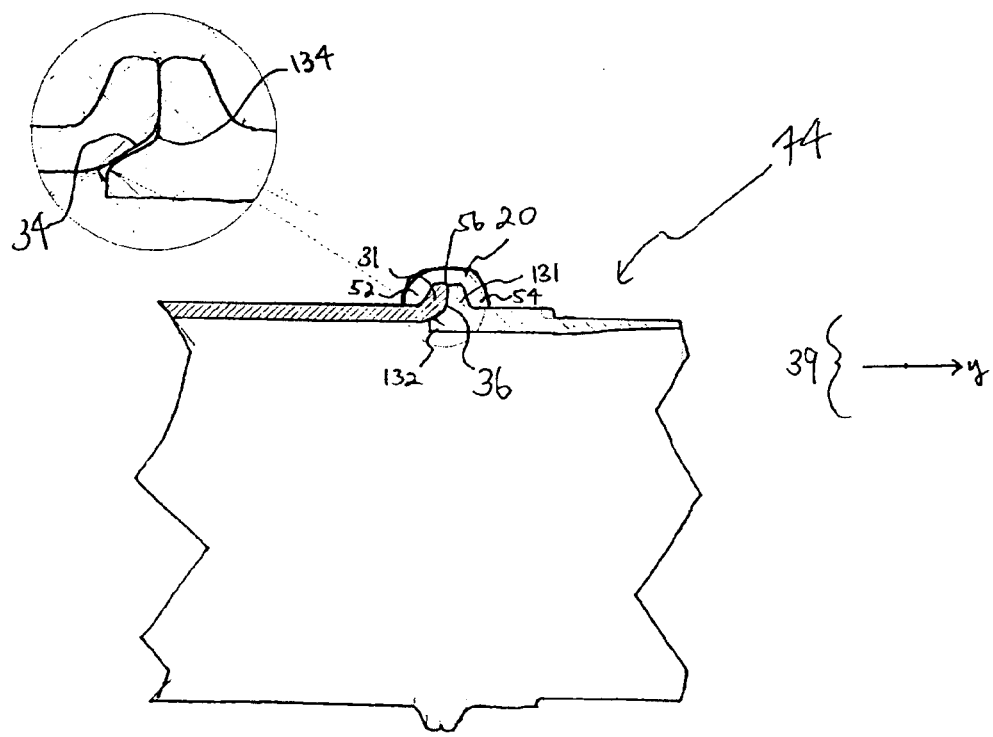
FIG. 7B depicts a cross sectional view of a junction connected with the clamp of FIG. 4A or FIG. 5A.

FIG. 7B depicts a cross sectional view of the down tube junction 74 sliced along the length of the tube after the clamp 20 has been tightened. This cross sectional view illustrates how the first annular lip 131, the inner lip 132, and the second annular lip 31 combine at the down tube junction 74. The first annular lip 131 and the inner lip 132 form the curve 134, and this curve 134 fits with the edge 34 of the connection tube 30 to form a curved interface 36, as shown. The first annular lip 131 and the second annular lip 31 are pressed against each other by the sidewalls 52 and 54 of the clamp 20. When the clamp 20 is placed over the annular lips 131, 31, the annular lips 131, 31 fit into the groove 56 and prevent the down tube 13 and the connection tube 30 from moving in along the y-direction as shown by an arrow 39. The presence of the inner lip 132 strengthens the structural integrity of the down tube junction 74 by providing extra support in the radial direction, and contributes to maintaining the second annular lip 31 matched with the first annular lip 131. More specifically, once the first annular lip 131 and the second annular lip 31 are placed inside the groove 56, the sidewalls 52 and 54 (see FIG. 4A) apply a force in both directions along the y-direction, pushing the annular lips into each other. When the clamp 20 is tightened, it applies onto the annular lips 131 and 31 a force directed radially inward (toward the center of the tube), and the inner lip 36 helps counter this inward radial force by "pushing" the annular lips into the groove 56, radially outward. The y-directional forces applied by the sidewalls 52 and 54, the radially inward force applied by the surface of the groove 56 that connects the sidewalls 52 and 54, and the radially outward force applied by the inner lip 132 together keep the annular rings 131 and 31 securely "locked." Hence, any sliding between the first annular lip 131 and the second annular lip 31 at the interface 36 is minimized. The down tube 13 and the connection tube 30 are typically hollow to reduce the weight of the bicycle. Since the annular lips are "locked" together by the clamp 20, the down tube 13 and the connection tube 31 cannot be separated without "opening" the clamp 20.

Figure 8A:
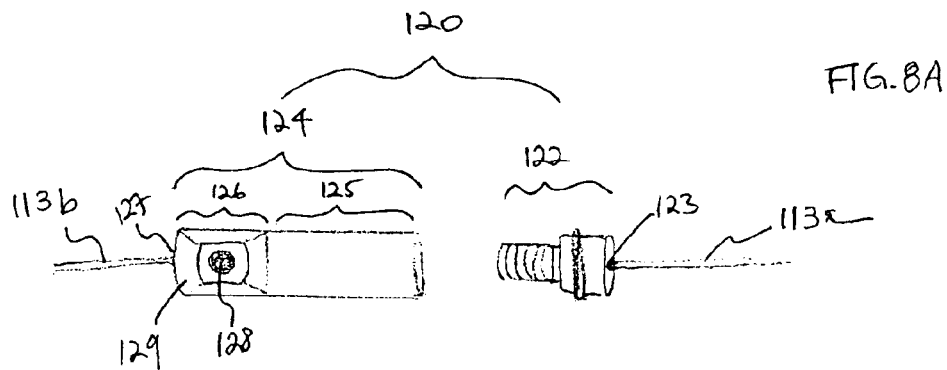
FIGS. 8A–8D depict a cable connector in accordance with the invention.

FIG. 8A depicts a cable connector 120 that is used to join a first portion cable 113a with the second portion cable 113b across the down tube junction 74 to form the derailleur cable 113 in accordance with the invention. The cable connector 120 includes a male connector 122 that screws into a female connector 124. The male connector 122 is a screw with a tunnel 123 that extends through the center of the head. The first portion cable 113a is inserted into the hole 123 and terminates with a standard end. As this standard end is thicker than the rest of the derailleur cable 113, the end does not get pulled out through the hole 123 and the first portion 113a of the cable remains connected to the male connector 122. The female connector 124 includes a threaded cavity 125 connected to a solid section 126. The threaded cavity 125 is designed to accommodate the male connector 122. Like the male connector 122, the solid section 126 has a tunnel that extends from an end of the female connector 124 to the threaded cavity 125. The second portion cable 113b is inserted through this tunnel. Then, a bolt 128 is screwed into the tunnel in the direction of the plane of the page, in a direction orthogonal to the direction in which the tunnel extends. The bolt 128 may be, for example, an allen key bolt or a set screw. As the bolt 128 is screwed in, it comes in contact with the second portion cable 113b that lies in the tunnel, and eventually presses the second portion cable 113b against an inner wall of the tunnel. By pressing the cable hard against the inner wall of the tunnel, the bolt 128 prevents the cable from sliding in and out of the tunnel, effectively keeping it fixed to the female connector 124.

The bolt 128 is inserted through openings located on a platform 129, which is raised above the rest of the outer surface of the female connector 124. The platform 129 is raised to accommodate the bolt 128, which needs to have a predetermined minimum length in order to effectively hold the second portion cable 113b in place. Without the platform 129, the bolt 128 could only be as long as the distance between the surface of the female connector 124 and the wall of the tunnel that runs through it. If this distance is too short, the bolt 128 would be too short and could crack under strain during a ride. Since the first portion cable 113a is fixed to the male connector 122 and the second portion cable 113b is connected to the female connector 124, the two cable portions are connected to form a derailleur cable 113 when the male connector is screwed into the threaded cavity 125 of the female connector 124.

Figure 8B:
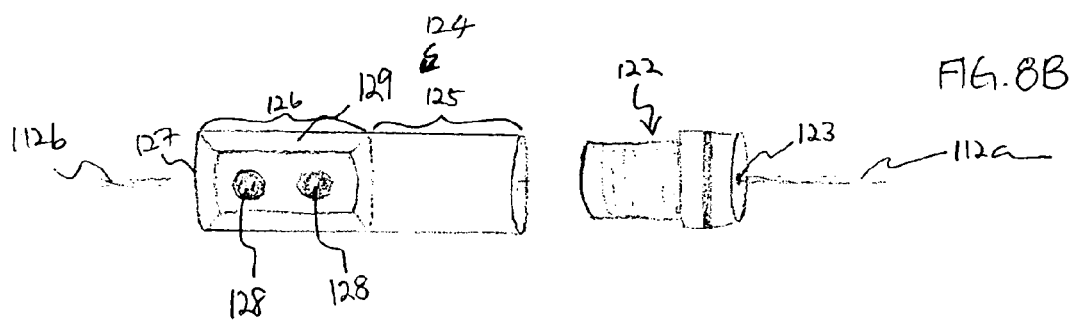

FIG. 8B depicts an alternative embodiment of the cable connector 120. This cable connector 120 is substantially similar to the cable connector shown in FIG. 8A, except that the overall size is larger and there is an extra bolt 128 on the platform 129. The invention is not limited to being implemented with a cable connector of a certain size or shape, and may be any two parts that can be disengagably yet securely fixed to each other wherein one part is securely connected to a first portion of the cable and the other part is securely connected to a second portion of the cable that is to be connected with the first portion of the cable. In some embodiments, the smaller cable connector of FIG. 8A is used for connecting the derailleur cable 113 and the larger cable connector of FIG. 8B is used for connecting the brake cable 112. Since brake cables tend to be thicker than the derailleur cables, a larger cable connector may be suitable for a brake cable that takes more force to be fixed in place and a smaller cable connector may be suitable for a derailleur cable.

Figure 8C:
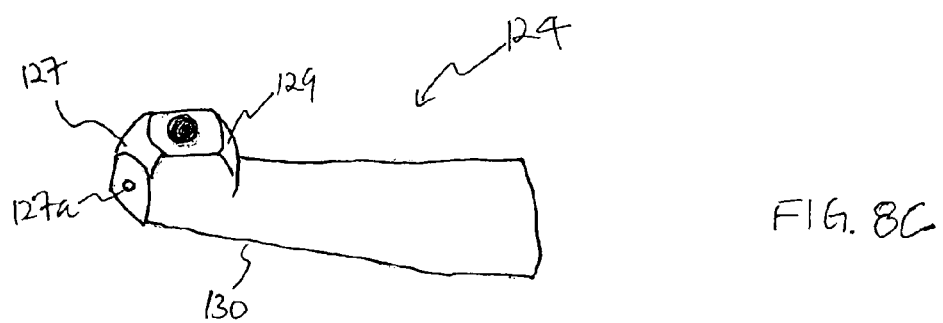
Figure 8D:
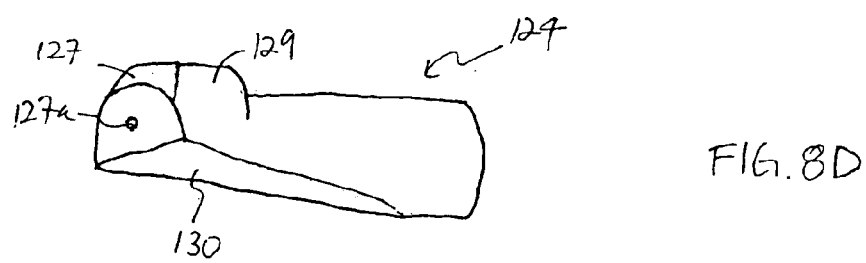
Figure 8E:
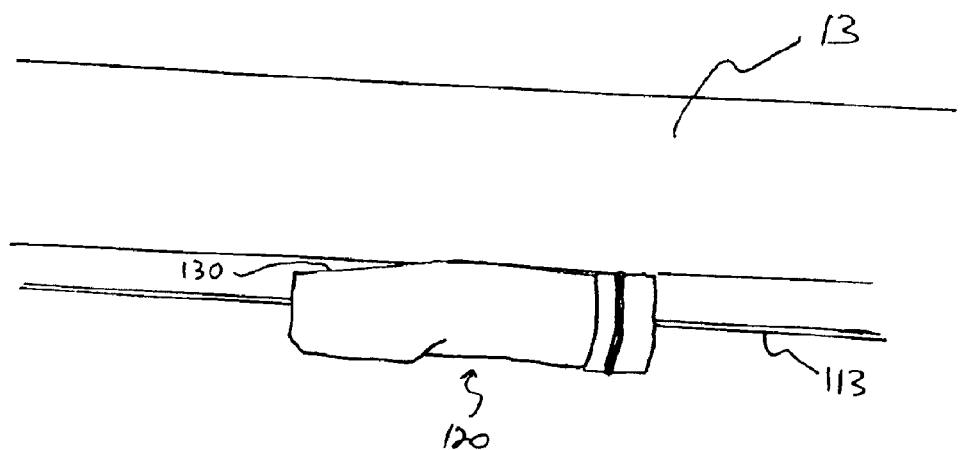
FIG. 8E depicts how the cable connector of FIGS. 8A–8D is positioned upon assemblage.

FIGS. 8C and 8D are isometric views of the female connector 124 of FIG. 8A shown from different angles. The isometric views show that the end 127 has an opening 127a into which the cable is inserted. The isometric view also shows that there is a flat portion 130 on the surface of the female connector 124 that is farthest away from the platform 129. When a cable is connected with the cable connector 120, the cable connector 120 is automatically positioned close to a portion of the frame such as the down tube 13 or the top tube 12, and rattles during the ride as two cylindrical objects vibrate against each other. The flat portion 130 is designed to reduce this rattling that is probably annoying to the rider. As shown in FIG. 8E, the flat portion 130 is positioned so that it is close to the nearby top tube 12. The flat portion 130 is shaped so that the rattling caused by the connection tube 120 "hitting" the top tube 12 is minimized without affecting the security with which the cable is fixed to the inside of the female connector 124.

Figure 9A:
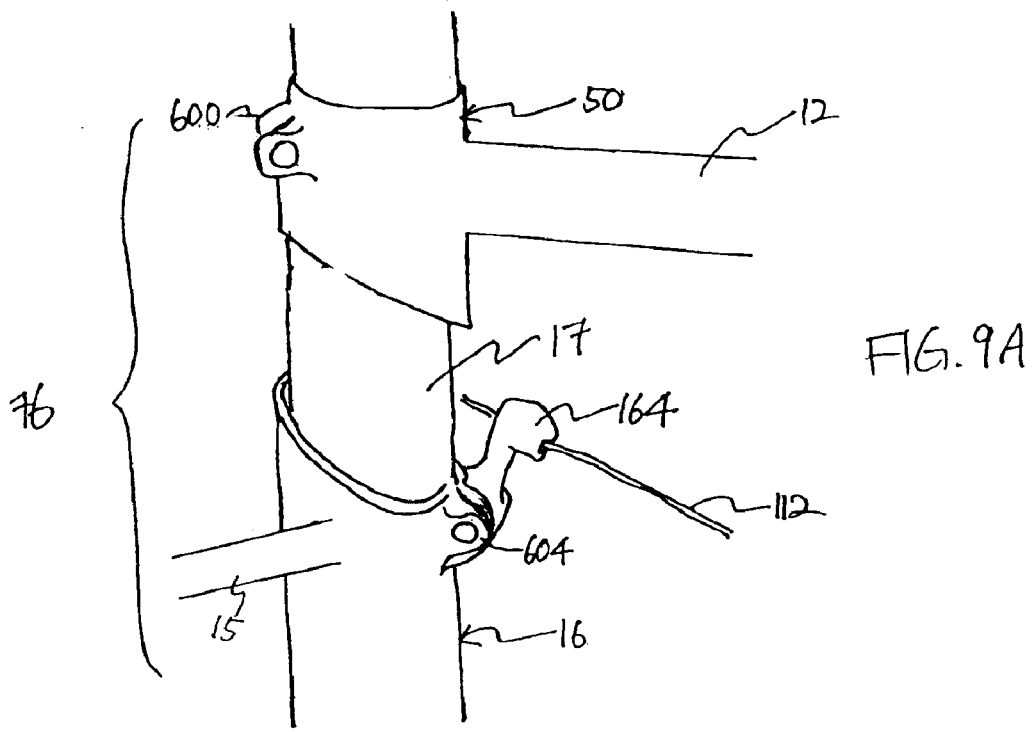
FIGS. 9A–9B depict a manner in which two tubes can be connected in accordance with the invention.

FIG. 9A depicts the seat tube junction 76 where the end tube 50 meets the seat tube 16. The end tube 50 and the seat tube 16, which preferably have the same diameter, are designed to be connected with the seat post 17, only a part of which is shown in FIG. 9A. The end tube 50 is welded on to the top tube 12 and integrated into the first bicycle frame section 70 (see FIG. 3) before the end tube 50 is connected with the seat tube 16. Likewise, the pair of seat stays 150 are welded on to the seat tube 16 and integrated into the second bicycle frame section 72 (see FIG. 2) before the seat tube 16 is connected to the end tube 50. The seat post 17 is designed to fit snugly through the end tube 50 and into the seat tube 16 from the top. Once the seat post 17 is inserted to the desired seat height, the lugs 600 and the lugs 604 are tightened around the seat post 17 so that the end tube 50 and the seat tube 16 are fixed in position. Connected to the seat tube 16 is a cable holder 164 designed to hold the cable 112 that extends across most of the length of the top tube 12. More details about the cable holder 164 is provided below, in reference to FIG. 9B.

Figure 9B:
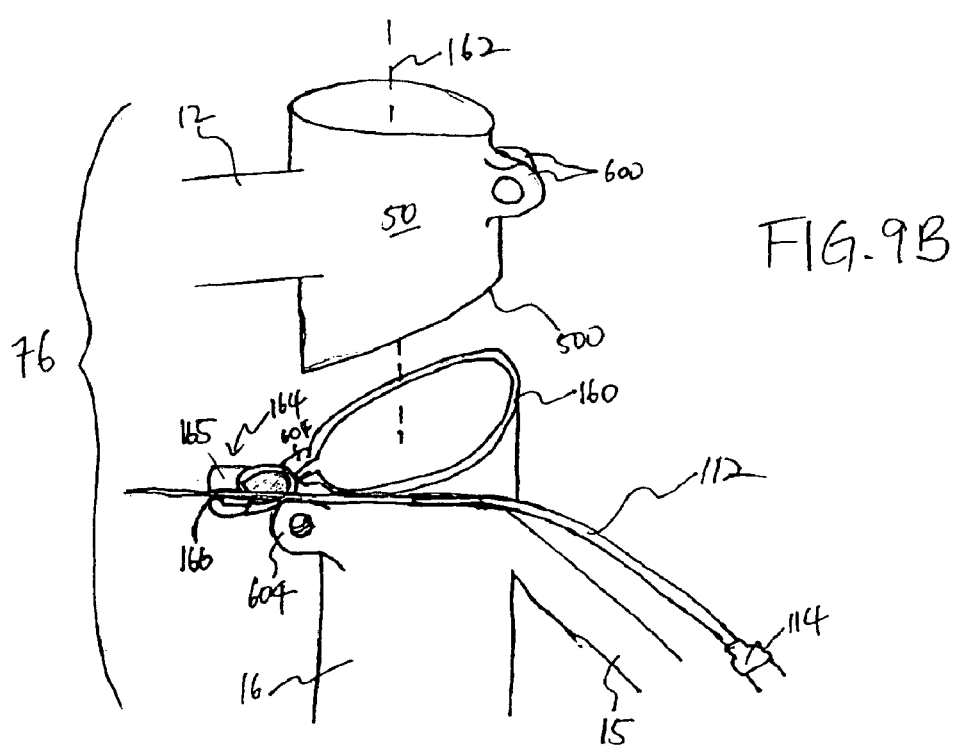

FIG. 9B depicts the seat tube junction 76 from a different angle than FIG. 9A, and omits seat post 17. FIG. 9B shows an exemplary embodiment of the cable holder 164 that includes a tubular structure 165 with a slit 166 along a sidewall so that the brake cable 112 can easily be placed into and taken out of the tubular structure 165. The brake cable 112 extends along the top tube 12, passes through the tubular structure 165, and then bends downward toward the rear wheel 3 (see FIG. 14). The tubular structure 165 is positioned to guide the brake cable 112 in a desired direction. Without the cable holder 164, the rear brake cable 112 would not travel substantially parallel to the top tube 12, but would slant down toward the brake pads, possibly being a nuisance to the rider as he pedals. The cable holder 164 keeps the leg area clear of cables.

The lower end 500 of the end tube 50 is cut at an angle, and the upper end 160 of the seat tube 16 is also cut at an angle to match the lower end 500 of the end tube 50. The angle of the lower end 500 and the angle of the upper end 160 are designed so that the end tube 50 and the seat tube 16 combine to form one long tube only when the end tube 50 and the seat tube 16 are positioned in a particular way relative to each other. For example, in the embodiment shown in FIG. 9B, the end tube 50 and the seat tube 16 fit together only when the top tube 12 is aligned with the space between the two lugs 604 attached to the seat tube 16. Therefore, when the end tube 50 and the seat tube 16 are properly placed to form a single tube, the two tubes do not rotate around an axis 162 through the center of the tube. Furthermore, the tube that results as a combination of the seat tube 16 and the end tube 50 is not perfectly vertical, but slightly slanted backwards (see FIG. 14) in order to comfortably accommodate the rider who leans forward to steer the bicycle. Thus, if the interface between the end tube 50 and the seat tube 16 lies in a plane that is orthogonal to the axis 162, the interface does not lie in a plane that is perpendicular to the direction of the gravity. As a result, the gravity applies a force in the plane of the interface, causing a great strain on the seat tube junction 76. Due to this strain, the seat tube 16 will "want" to slide forward and the end tube 50 will "want" to fall behind the seat tube 16, possibly causing an injury to the rider. This risk of injury is greatly reduced by cutting the lower end 500 of the end tube 50 and the upper end 160 of the seat tube 16 at an angle to the axis 162. By placing the interface in a plane that is not perpendicular to the axis 162, the interface can be positioned substantially perpendicular to the force of gravity. Thus, any force applied in the plane of the interface is minimized, and the strain at the seat tube junction 76 is greatly reduced.

The end tube 50 and at least the top portion of the seat tube 16 that is shown in FIGS. 9A and 8B may be made of any material that a person of ordinary skill in the art deems suitable. The material depends on the type of material the bicycle frame is made of. For example, if the top tube 12 and the down tube 13 are made of aluminum, the end tube 50 and the portion of the seat tube 16 near the seat tube junction 76 are preferably also made of aluminum.

Figure 10:
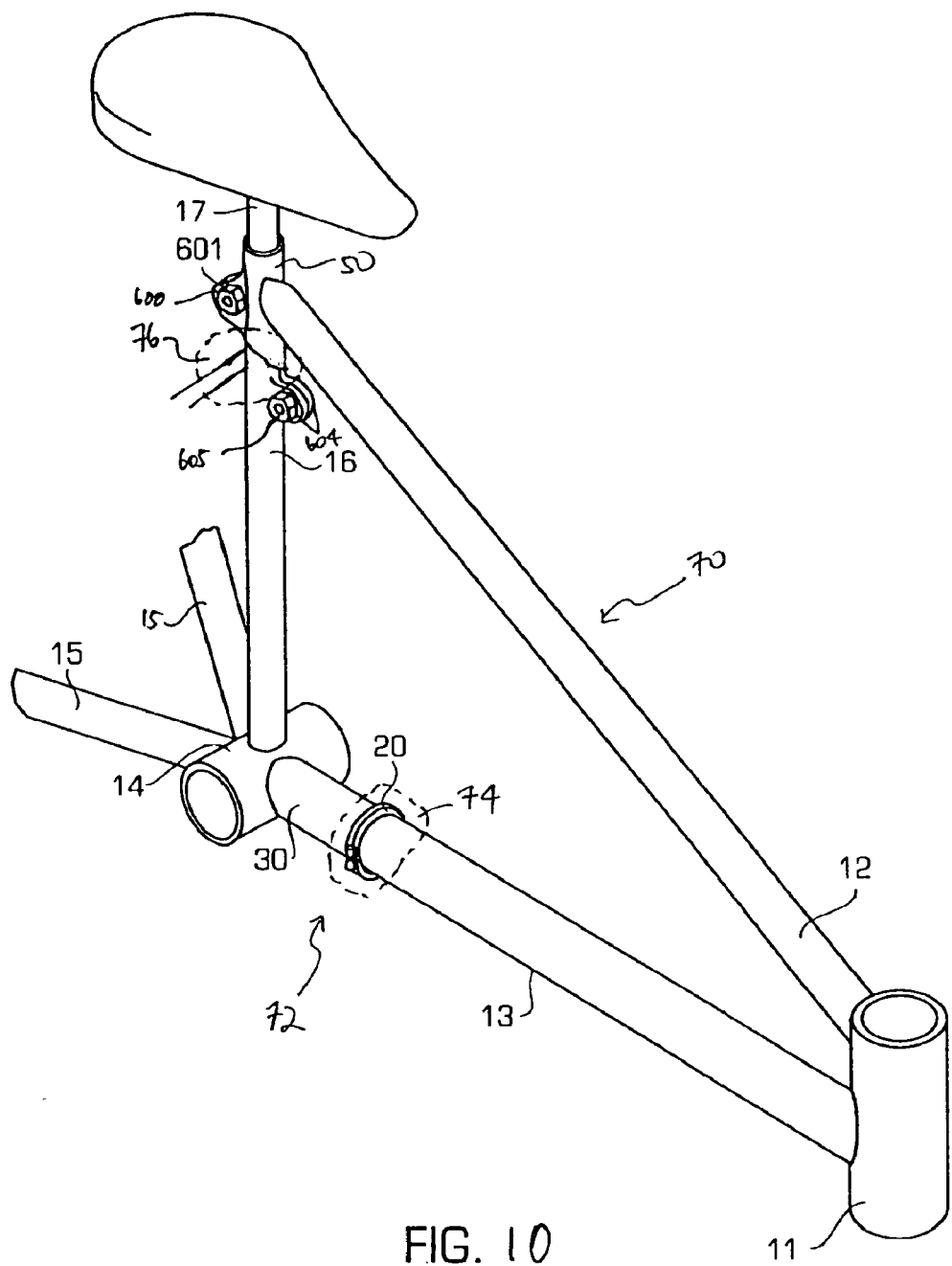
FIG. 10 depicts an alternative multi-piece bicycle frame.

FIG. 10 depicts a bicycle frame 10 that includes the first bicycle frame section 70 and the second bicycle frame section 72 connected at the down tube junction 74 and the seat tube junction 76. Using the connection method in accordance with the invention, the two pieces of the frame are connected together in a secure manner. More specifically, the down tube junction 74 is secured with a clamp 20 in the manner described above in reference to FIG. 4B, FIG. 5B, and FIG. 7. The seat tube junction 76 is secured by tightening the lugs 500 and the lugs 604 around the seat post 17 as tightly as possible, in the manner described above in reference to FIG. 9A and FIG. 9B. These connection methods are especially advantageous in that they establish a secure connection even if the portions of the frame that are connected together are of dissimilar materials. Furthermore, these connection methods provide an easily reversible connection. The connection tube 30 and the down tube 13 can be separated by opening the clamp 20, and the end tube 50 and the seat tube 16 are separated by loosening the lugs 600 and 605 and sliding out the seat post 17.

Figure 11:
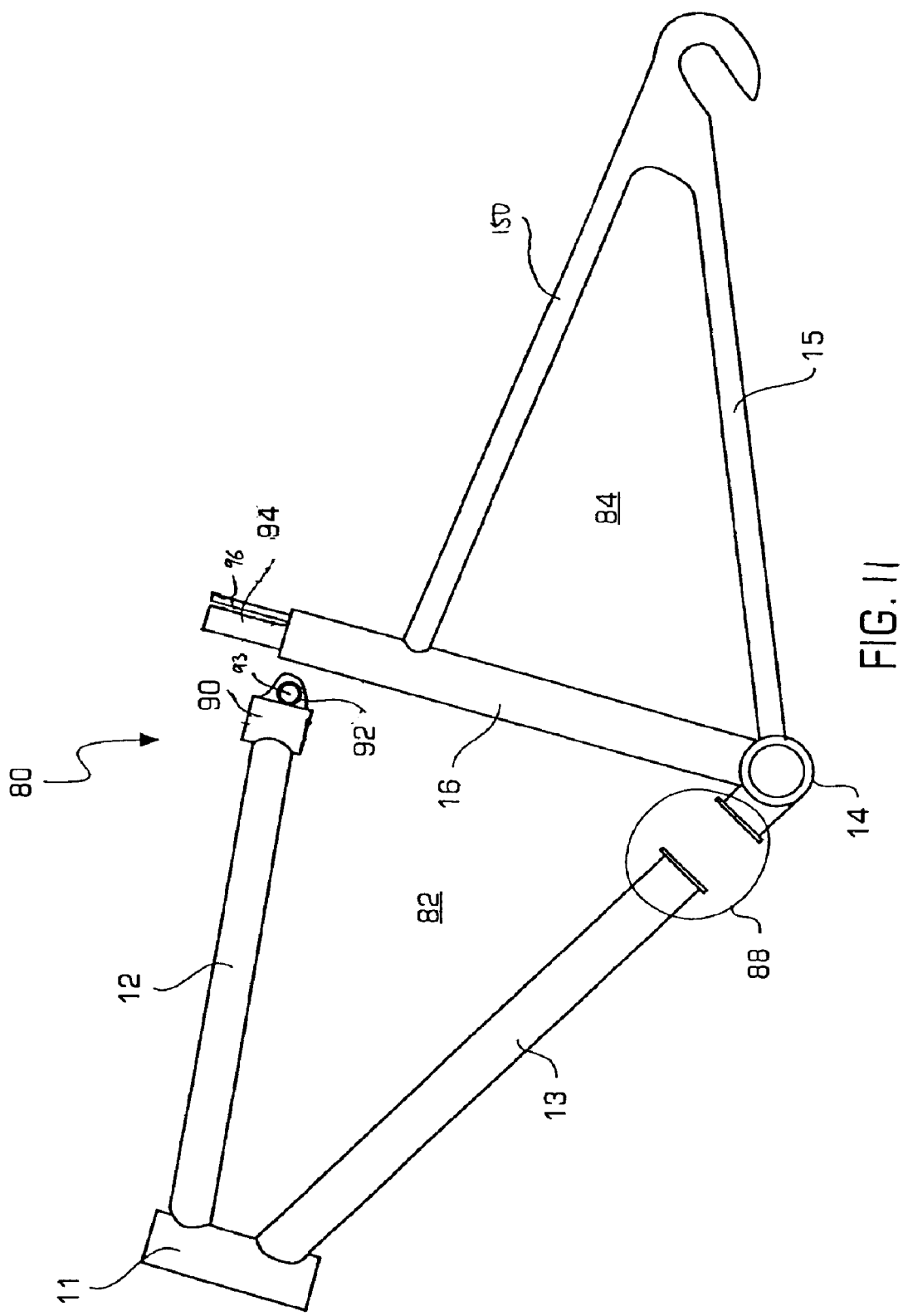
FIG. 11 depicts a third alternative multi-piece bicycle frame.

FIG. 11 is a diagram illustrating another example of a multi-piece bicycle frame 80 being connected together using the clamp 20 and another component. As this bicycle frame 80 has similar components to the frame as shown in FIG. 10 that have like reference numerals, those components will not be described here. In this embodiment, a first portion 82 that includes the head lug 11, the top tube 12 and the down tube 13 is connected to a second portion 84 that includes the seat tube 16, the chain stays 15 (only one is shown), and the seat stays 150 (only one is shown). At an upper end, the first portion 82 may include a hollow tube 90 that includes a pair of lugs 92. The lugs 92, which are similar to the lugs 600 and lugs 604 depicted in FIG. 9A, are separated by a gap between the two lugs 92 that can be narrowed with a bolt (not shown) inserted into the holes 93. The second portion 84 comprises a smaller tube 94 having a slot 96 on its side. When the first portion 82 is coupled with the second portion 84, the hollow tube 90 of the first portion slides over the smaller tube 94. The smaller tube 94, which is also hollow, accommodate a seat post. Once the hollow tube 90 is slid over the smaller tube 96 and the seat post is inserted into the smaller tube 96, the lugs 92 are tightened. When the lugs 92 are tightened, a radially inward pressure is applied to the smaller tube 94 and the slit 96 is narrowed. Thus, by tightening the lugs 92, the smaller tube 94, the seat post that is inserted into the smaller tube 94, and the hollow tube 90 are is fixed in place. In this manner, the multi-piece bicycle frame is connected together using the connecting system in accordance with the invention.

In this embodiment, the first portion 82, known as a front triangle, may have one or more different custom sizes and may be made out of an alloy of steel and titanium. The second portion 84, known as a rear triangle, may have one or more different sizes and may be made out of carbon kevlar fiber material. In this embodiment, the two portions are constructed of different materials since the two portions have desirable different properties (e.g., the front portion needs to be strong to absorb shock and force while the rear portion can be lightweight to reduce the weight of the frame) so that the two portions are desirable connected together using the connecting system in accordance with the invention. Thus, in accordance with the invention, the multi-piece frame may include a clamp that connects a lower end of the first and second dissimilar material portions at a junction 88.

Figure 12A:
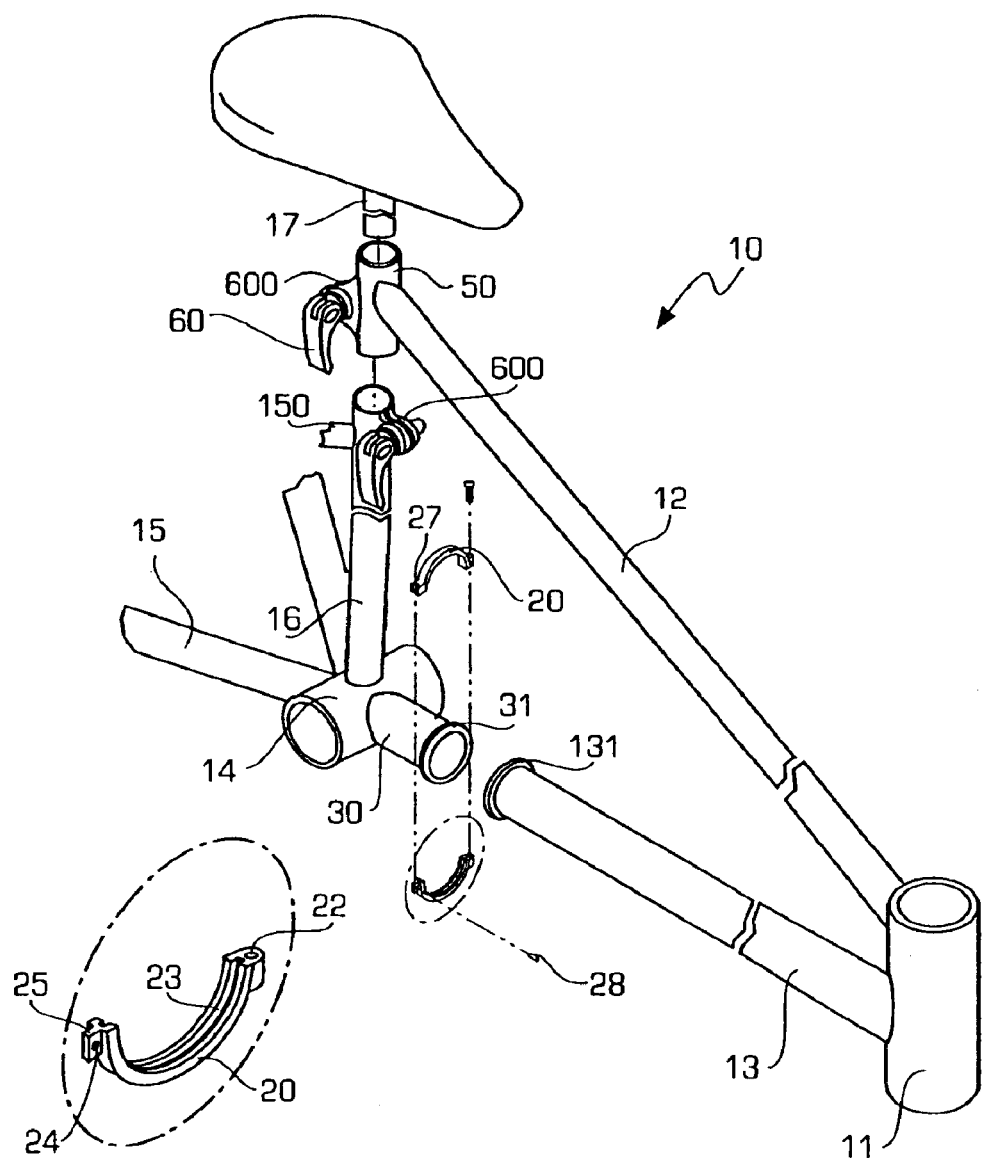
FIGS. 12A and 12B depict a fourth alternative multi-piece bicycle frame.
Figure 12B:
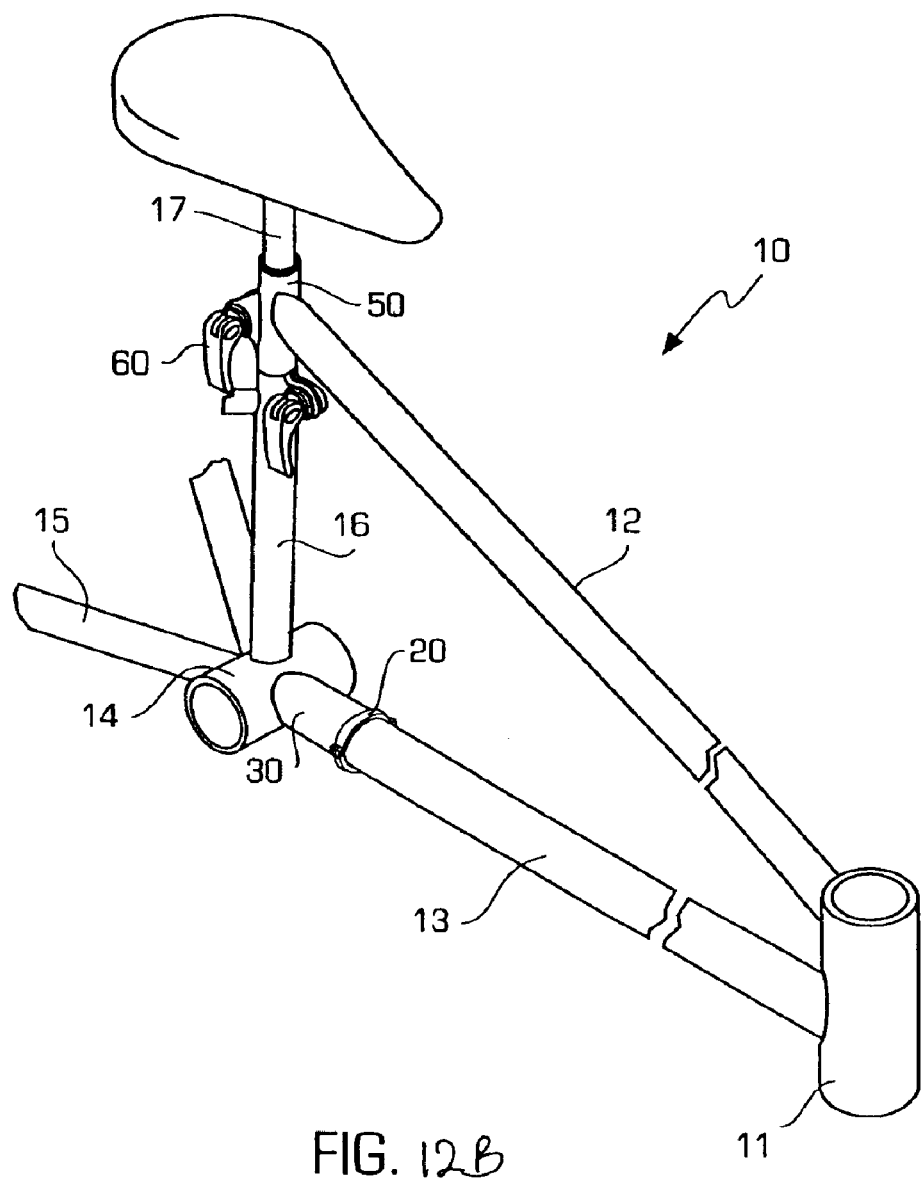

FIGS. 12A and 12B illustrate another embodiment of the multi-piece bicycle frame being connected together using a clamp similar to the clamp 20 of FIG. 5A and another component. A protrusion 25 and a lug 22 are respectively connected to two ends of one of the two parts 20. The other part 20 has a slot 27 defined in one end thereof and a lug 22 on the other end thereof. The protrusion 25 is received in the slot 27 and connected with each other by a bolt 28. Another bolt extends through the two aligned lugs 22. The two ring-shaped lugs 600 are cooperated with a quick-release device to secure the seat post 17 and the end tube 50.

Figure 13:
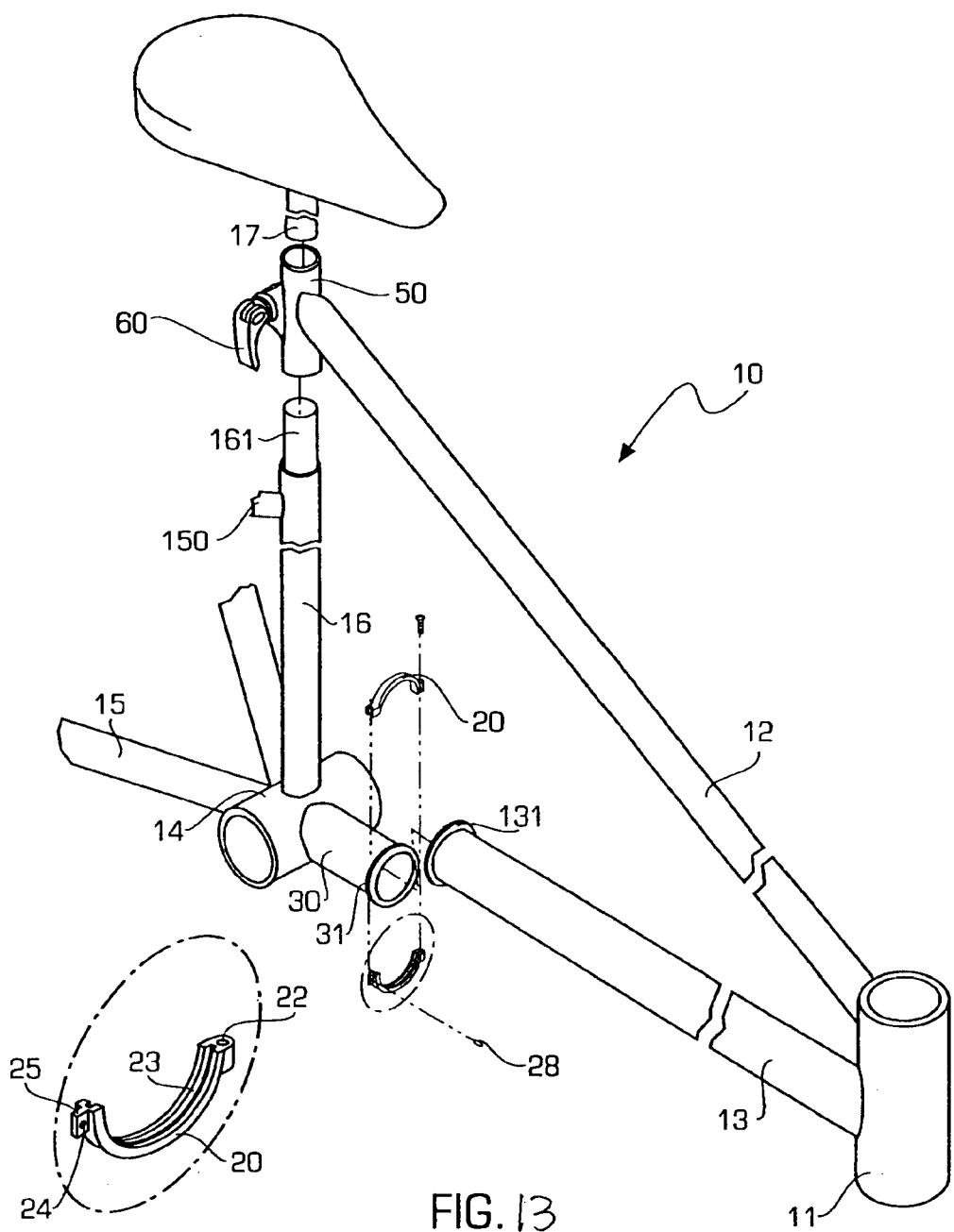
FIG. 13 depicts a fifth alternative multi-piece bicycle frame.

FIG. 13 illustrates yet another embodiment of the multi-piece bicycle frame 10 being connected together using the connecting clamp and another component. In particular, FIG. 13 shows that only one quick-release device 60 that is connected to the end tube 50 and an insertion 161 is connected to the seat tube 16. The quick release device 60 comprises a handle that tightens a tube around another smaller tube to hold the two tubes together. In more detail, the insertion 161 and the seat post 17 are then secured in the end tube 50 by the quick-release device 60. The two parts of the frame are designed so that when the end tube 50 fits over the insertion 161, the annular lips 31 and 131 match up. The clamp 20 can then be used to connect the down tube 13 with the connection tube 30.

While the foregoing has been with reference to a particular embodiment of the invention, it will be appreciated by those skilled in the art that changes in this embodiment may be made without departing from the principles and spirit of the invention.

What is claimed is:

1. A bicycle frame comprising:
   a first frame section including a first tube and a third tube, the first tube having a first protruding portion; and
   a second frame section including a second tube and a fourth tube, the second frame section having a second protruding portion;
   wherein the first tube and the second tube are disengagably coupled to each other to form an annular interface at a first junction, wherein the annular interface is fixed by a clamp surrounding the annular interface, and wherein the third tube and the fourth tube are disengagably coupled with a post that is inserted into the third tube and the fourth tube to form a second junction.

2. The bicycle frame of claim 1, wherein the first tube comprises a first portion of a down tube that is connected to a top tube by a head tube, and the second tube comprises a second portion of a down tube that is connected to a seat tube.

3. The bicycle frame of claim 1, wherein the first protruding portion comprises a first annular lip located at an end of the first tube, the first annular lip having an outer diameter larger than an outer diameter of the first tube, and wherein the second protruding portion comprises a second annular lip located at an end of the second tube, the second annular lip having an outer diameter larger than an outer diameter of the second tube.

4. The bicycle frame of claim 3, wherein the first protruding portion further comprises an inner lip having an outer diameter smaller than the outer diameter of the first tube, wherein the inner lip is positioned to be inserted into the second tube if the first tube and the second tube to be disengagably coupled to each other with the clamp.

5. The bicycle frame of claim 4, wherein the inner lip is designed to counter a force applied by the clamp toward a center of the junction so that the first annular lip and the second annular lip are located between the clamp and the inner lip.

6. The bicycle frame of claim 1, wherein the first protruding portion and the second protruding portion are pressed against each other by the clamp.

7. The bicycle frame of claim 1, wherein the clamp comprises a groove into which the first protruding portion and the second protruding portion fit.

8. The bicycle frame of claim 7, wherein the groove is tapered so that the deeper portion of the groove is narrower compared to the shallower portion of the groove.

9. The bicycle frame of claim 7, wherein the groove comprises teeth including shallow portions and deep portions arranged in an alternating manner, each of the deep portions designed to fit around the first protruding portion and the second protruding portion.

10. The bicycle frame of claim 1, wherein the clamp comprises an upper arm and a lower arm that disengagably couple to form a frame that fits around the first protruding portion and the second protruding portion.

11. The bicycle frame of claim 1, wherein the first tube and the second tube are made of different materials.

12. The bicycle frame of claim 1 wherein a sidewall of the third tube is welded to a top tube of the bicycle frame, each of the third tube and the fourth tube comprising a tightening mechanism so that the third tube and the fourth tube are disengagably coupled by being tightened around the post after the post is inserted through the third tube and the fourth tube.

13. The bicycle frame of claim 1, further comprising a cable holder attached to one of the third and the fourth tubes, the cable holder including a tubular structure with an opening on the sidewall through which a cable can be placed in the tubular structure to guide the cable in a preselected direction.

14. The bicycle frame of claim 1, wherein an interface of the third tube and the fourth tube lies in a plane that is perpendicular to the force of gravity.

15. The bicycle frame of claim 14, wherein the third tube and the fourth tube combine to form a seat tube, wherein an axis through a center of the seat tube is not perpendicular to the plane.

16. The bicycle frame of claim 1, further comprising a first portion cable and a second portion cable that connect to form one of a derailleur cable and a brake cable, wherein the first portion cable is connected to a first part of a cable connector that is designed to be disengagably coupled with a second part of the cable connector that is connected to the second portion cable.

17. The bicycle frame of claim 16, wherein the first part of the cable connector comprises a screw bolt with a first tunnel extending through the screw bolt to accommodate the first portion cable, and wherein the second part of the cable connector comprises a threaded cavity designed to accommodate the screw bolt.

18. The bicycle frame of claim 16, wherein the second part of the cable connector comprises a solid portion with a second tunnel accommodating the second portion cable, the solid portion further comprising an opening through which a set screw is inserted in a direction orthogonal to the direction of the second tunnel so that the set screw fixes the second portion cable in place by pressing the second portion cable against an inner wall of the second tunnel.

19. The bicycle frame of claim 1, wherein one of the first tube and the second tube includes carbon fiber and the other one of the first and the second tubes includes a metal.

20. A mechanism for coupling bicycle components, the coupling mechanism comprising:

a clamp having an inside wall and an outside wall, wherein the clamp includes a first arm and a second arm, and wherein the first arm and the second arm are each curved in a semicircular shape and the interface has a circular shapes;

a groove on the inside wall wherein the groove fits over a first protruding section and a second protruding section of a first object and a second object, respectively, to hold the two objects in fixed positions relative to each other and wherein the first and the second protruding sections are first and second annular lips, the first and the second annular lips having teeth;

deep regions and shallow regions located in the groove, each of the deep regions shaped to fit the first protruding section and the second protruding section to maintain an interface between the first protruding section and the second protruding section; and a tightening mechanism that tightens the clamp around the interface.

21. The coupling mechanism of claim 20, wherein the first and the second annular lips are pressed against each other by being held together in the groove.

22. A mechanism for coupling bicycle components, the coupling mechanism comprising:

a clamp having an inside wall and an outside wall;

a groove on the inside wall wherein the groove fits over a first protruding section and a second protruding section of a first object and a second object, respectively, to hold the two objects in fixed positions relative to each other;

deep regions and shallow regions located in the groove, each of the deep regions shaped to fit the first protruding section and the second protruding section to maintain an interface between the first protruding section and the second protruding section, wherein the groove is tapered so that the deep regions are narrower than the shallow regions and the first protruding section and the second protruding section are pressed harder against each other as the clamp is tightened around the interface, forcing the first and the second protruding sections into the deep regions; and a tightening mechanism that tightens the clamp around the interface.

23. A mechanism for coupling bicycle components, the coupling mechanism comprising:

a clamp having an inside wall and an outside wall;

a groove on the inside wall wherein the groove fits over a first protruding section and a second protruding section of a first object and a second object, respectively, to hold the two objects in fixed positions relative to each other, wherein the first and the second protruding sections comprise a plurality of teeth;

deep regions and shallow regions located in the groove, each of the deep regions shaped to fit the first protruding section and the second protruding section to maintain an interface between the first protruding section and the second protruding section and wherein the deep regions are positioned to accommodate the teeth so that when the clamp is fit around the interface, one of the teeth on the first protruding section and one of the teeth on the second protruding section are inserted into one of the deep regions, and a tightening mechanism that tightens the clamp around the interface.

24. The coupling mechanism of claim 20, wherein the first arm and the second arm that are coupled with a hinge so that the first arm and the second arm pivot around the hinge.

25. The coupling mechanism of claim 20, wherein the tightening mechanism comprises a first connecting shoulder attached to an end of the first arm and a second connecting shoulder attached to an end of the second arm, the first and the second connecting shoulders each having a hole so that the first arm and the second arm are coupled with a bolt inserted through the holes.

26. A mechanism for coupling bicycle components, the coupling mechanism comprising:

a clamp having an inside wall and an outside wall;

a groove on the inside wall wherein the groove fits over a first protruding section and a second protruding section of a first object and a second object, respectively, to hold the two objects in fixed positions relative to each other, wherein the two objects are made of different materials;

deep regions and shallow regions located in the groove, each of the deep regions shaped to fit the first protruding section and the second protruding section to maintain an interface between the first protruding section and the second protruding section; and a,tightening mechanism that tightens the clamp around the interface.

27. The coupling mechanism of claim 26, wherein the different materials include carbon fiber and metal.

* * * * *